United States Patent [19]

Suzuki

[11] 4,278,993
[45] Jul. 14, 1981

[54] COLOR PICTURE-IN-PICTURE TELEVISION RECEIVER

[75] Inventor: Toshio Suzuki, Yokohama, Japan

[73] Assignee: Sony Corporation, Tokyo, Japan

[21] Appl. No.: 93,675

[22] Filed: Nov. 13, 1979

[30] Foreign Application Priority Data

Nov. 20, 1978 [JP] Japan ................................ 53-143144

[51] Int. Cl.³ .............................................. H04N 9/535
[52] U.S. Cl. ....................................... 358/22; 358/181; 358/183
[58] Field of Search ................... 358/22, 181, 182, 183

[56] References Cited

U.S. PATENT DOCUMENTS

| 4,063,280 | 12/1977 | Hattori | 358/22 |
| 4,139,860 | 2/1979 | Micic | 358/22 |

OTHER PUBLICATIONS

Masuda, et al., "Fully Digitalized Color Picture in Picture Television System," Feb. '79, pp. 152-159, IEEE Trans. on Consumer Electronics.

Primary Examiner—Robert L. Griffin
Assistant Examiner—M. A. Masinick
Attorney, Agent, or Firm—Hill, Van Santen, Steadman, Chiara & Simpson

[57] ABSTRACT

A system for inserting a reduced picture of a first channel broadcast into a picture of a second channel broadcast on a single screen in a picture-in-picture television receiver. First and second video signal chains are provided. A first group of three memories connects to the first chain for memorizing R, G and B signals obtained from a first field of video signals of the first channel broadcast. A second group of three memories is connected to the first chain for memorizing R, G and B signals obtained from a second field of the video signals of the first channel broadcast. With the disclosed system, picture flicker problems are solved and the horizontal resolution is improved.

8 Claims, 3 Drawing Figures

COLOR PICTURE-IN-PICTURE TELEVISION RECEIVER

BACKGROUND OF THE INVENTION

This invention relates to a color picture-in-picture television receiver in which a reduced picture of one (called "B" hereinafter) station channel broadcast is formed in a picture of another (called "A" hereinafter) station channel broadcast on a single screen, and more particularly to a color picture-in-picture television receiver in which the reduced picture is improved in horizontal resolution.

In a conventional picture-in-picture television receiver, video signals of the B channel broadcast (designated by "$S_B$" hereinafter) are alternately written into two field memories every field. While the video signals are written into the one field memory, the video signals are read out from the other field memory. The read out video signals are inserted into a blanking interval formed at a predetermined portion of the video signals of the A channel broadcast station (designated by "$S_A$" hereinafter). A charge-coupled Device (CCD) or a Bucket-Brigade Device (BBD) consisting of charge transferring elements is used for the field memory. The signals $S_B$ are sampled by writing pulses of a predetermined frequency. The sampled signals $S_B$ are written into the field memory. The signals $S_B$ are not sampled at the times between the successive writing pulses. Accordingly, the reduced picture is deteriorated in horizontal resolution. In a method to remove such deterioration, one train of writing pulses to be applied to the one field memory is made to be opposite in phase to another train of writing pulses to be applied to the other field memory. Thus, the video signals $S_B$ are sampled by the one train of writing pulses at times corresponding to the times when the video signals $S_B$ are not sampled by the other train of writing pulses to be written into the one field memory. This method is useful for video signals $S_B$ which are black-and-white television signals. However, when R(Red)-, G(Green)- and B(Blue)-components of color television video signals $S_B$ are sampled at the same time by any one of the writing pulses, the picture flickers and a vertical line in the picture becomes a notched line.

SUMMARY OF THE INVENTION

Accordingly, it is an object of this invention to provide a color picture-in-picture television receiver by which the above-described problem can be solved.

Another object of this invention is to provide a color picture-in-picture television receiver in which the horizontal resolution is improved without flicker.

In accordance with an aspect of this invention, there is provided a color picture-in-picture television receiver in which a reduced picture of one channel broadcast is inserted into a picture of another channel broadcast on a single screen. Three memories are provided for memorizing R-, G- and B-signals obtained from the first field of the video signals of the one channel broadcast. An additional three memories are provided for memorizing R-, G- and B-signals obtained from the second field of the video signals of the one channel broadcast. One of the R-, G- and B-signals and the remaining two of the R-, G- and B-signals are written into the corresponding one of the three memories and the corresponding remaining two of the three memories during the first field by one train of writing pulses. Another train of writing pulses opposite to the one train in phase is provided. One of the R-, G- and B-signals and the remaining two of the R-, G- and B-signals are written into the corresponding one of the other three memories and the corresponding remaining two of the other three memories during the second field by the other train of writing pulses and the one train of writing pulses, respectively.

DESCRIPTION OF THE PREFERRED EMBODIMENTS

Next, one embodiment of this invention will be described with reference to the drawings.

Figure 1:
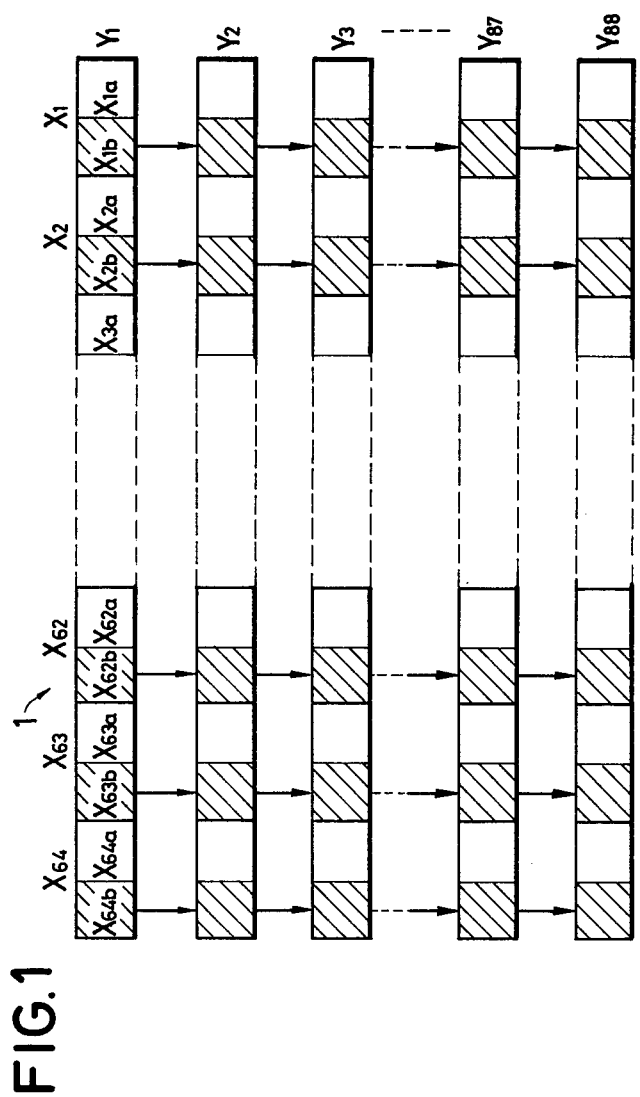
FIG. 1 is a schematic view of a memory used for one embodiment of this invention.

FIG. 1 shows an arrangement of a field memory 1 consisting of BBDs (Bucket Brigade Devices) used in one embodiment of this invention. The field memory 1 is for the case when the picture of the video signals $S_B$ reduced by a scale of one to three is inserted into the picture of the video signals $S_A$. The field memory 1 has the so-called "SPS" (Serial-Parallel-Serial) construction. In the SPS construction, eighty eight BBDs $y_1$ to $y_{88}$ are connected in parallel to each other. Each of the BBDs consists of sixty four bit-cells $x_1$ to $x_{64}$ connected in series to each other. The video signals $S_B$ of one horizontal scanning period (1H) are written into one of the BBDs $y_1$ to $y_{88}$ in order every third horizontal scanning period. Accordingly, the number of the BBDs is determined by the following equation:

$$(525/2) \times (1/3) \approx 88$$

The bit-cells $x_1$ to $x_{64}$ are divided into two cells $x_{1A}$ and $x_{1B}$, $x_{2A}$ and $x_{2B}$, - - -, and $x_{64A}$ and $x_{64B}$, respectively. Information stored in each of the cells $x_{1B}$, $x_{2B}$, - - - and $x_{64B}$ of each of the BBDs $y_1$ to $y_{88}$ is transferred into the next of the BBDs $y_1$ to $y_{88}$ in the direction shown by the arrows.

One field of the video signals $S_B$ is written into the above-described field memory 1 by two trains of writing pulses opposite to each other in phase. First, an information is written into the cell $x_{1A}$ of the BBD $y_1$ by the first writing pulse. The information is transferred into the cell $x_{1B}$ by a second writing pulse, and further transferred into the cell $x_{2A}$ by a third writing pulse. New information is sampled and stored into the field memory 1 every writing pulse. The stored information is transferred in order of the bit-cells $x_1$ to $x_{64}$. When all of the cells $x_{1B}$ to $x_{64B}$ have obtained the information, the writing operation of the video signals $S_B$ of one horizontal scanning time ends. Then, a shift pulse is supplied to the field memory 1 to transfer the information from the cells $x_{1B}$ to $x_{64B}$ of the BBD $y_1$ into the cells $x_{1B}$ to $x_{64B}$ of the next BBD $y_2$. And the video signals of a next one horizontal scanning time (1H) are written into the BBD $y_1$. When all of the cells $x_{1B}$ to $x_{64B}$ have obtained the information, the writing operation of the video signals $S_B$ of the next one horizontal scanning time ends. Then, a next shift pulse is supplied to the field memory to transfer the information from the cells $x_{1B}$ to $x_{64B}$ of BBD $y_2$ into the cells $x_{1B}$ to $x_{64B}$ of the third BBD $y_3$, and concurrently transfer the information from the cells $x_{1B}$ to $x_{64B}$ of the first BBD $y_1$ into the cells $x_{1B}$ to $x_{64B}$ of the second BBD $y_2$.

The above-described writing operations are repeated. Finally, the information is stored into all of the cells $x_{1B}$ to $x_{64B}$ of the BBDs $y_1$ to $y_{88}$, as shown by the hatch lines in FIG. 1. Thus, one field of the video signals $S_B$ has been written into the field memory 1. The information is read out in the order of $y_{88}$ to $y_1$ by two trains of read-out pulses opposite to each other in phase. This read out occurs horizontally at a speed three times as high as the horizontal scanning speed. In other words, the information is read out from one of the BBDs $y_1$ to $y_{88}$ in one third of the horizontal scanning time 1H.

According to this invention, there are provided six field memories, each of which is constructed as above described. The six field memories are used two by two for R-, G- and B-signals, respectively. One of the two field memories is used for the first field. The other of the two field memories is used for the second field. While the information is written into the three field memories for the first field of video signals, the other information is read out from the other three field memories for the second field of video signals. Thus, the information is alternately written into and read out from the three field memories every field.

Figure 2:
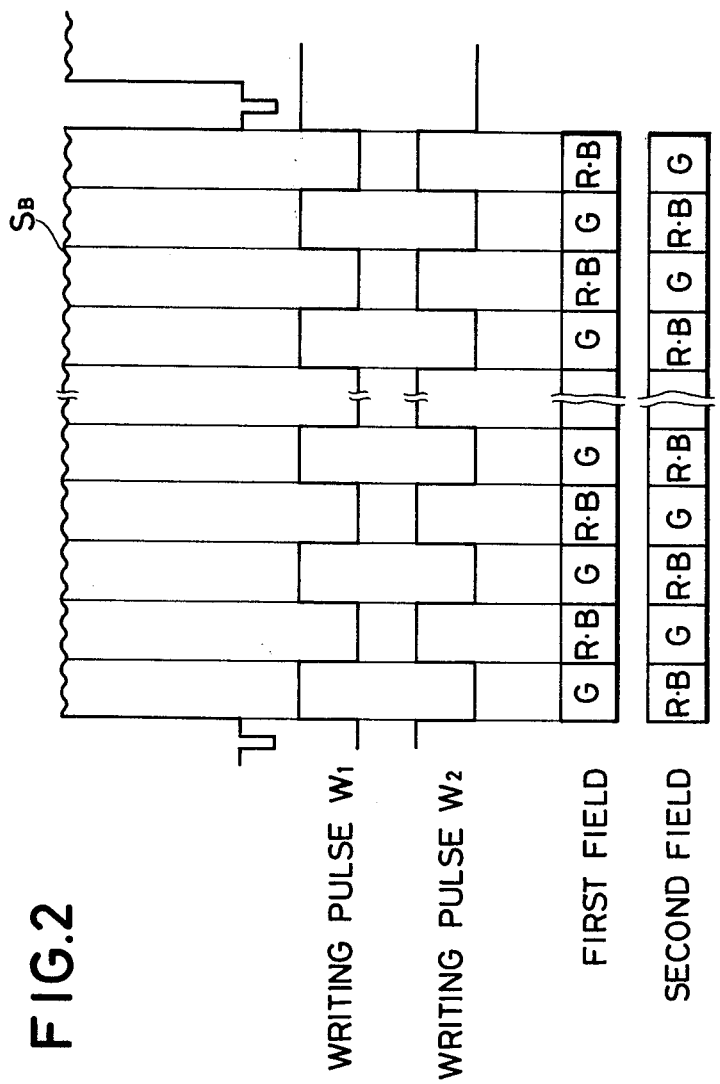
FIG. 2 is a timing chart for explaining the principle of this invention.

According to this invention, the R-, G-, and B-signals of the video signals $S_B$ of the first and second fields are written into the field memories in accordance with the timing chart shown in FIG. 2. In FIG. 2, the video signals of one horizontal scanning time 1H are shown for the first and second fields. The one horizontal scanning time 1H for the first field corresponds to that for the second field in FIG. 2.

In the first field, the G-signal of the video signal $S_B$ is sampled and written into the one of the three field memories by a train of writing pulses $W_1$, while the R- and B-signals of the video signals $S_B$ are simultaneously sampled and written into the remaining two of the three field memories by another train of writing pulses $W_2$ opposite in phase to the writing pulses $W_1$. In the second field, the G-signal of the video signal $S_B$ is sampled and written into the one of the other three field memories by the other train of writing pulses $W_2$, while the R- and B-signals of the video signals $S_B$ are simultaneously sampled and written into the remaining two of the other three field memories by the one train of writing pulses $W_1$. The information is written into, and read out from the memory by the two trains of clock pulses opposite to each other in phase. The writing pulses $W_1$ and $W_2$ show timings for sampling and transferring.

A picture of one frame is formed by the read out information. The G-signal component and the R·B-signal component are compensated for each other between the adjacent two of the horizontal scanning lines. As a result, the horizontal resolution becomes apparently twice as high as when the trains of the writing pulses $W_1$ and $W_2$ are equal to each other in phase. There is no time that information is not sampled with respect to one field of video signals. Accordingly, the effect is increased.

Figure 3:
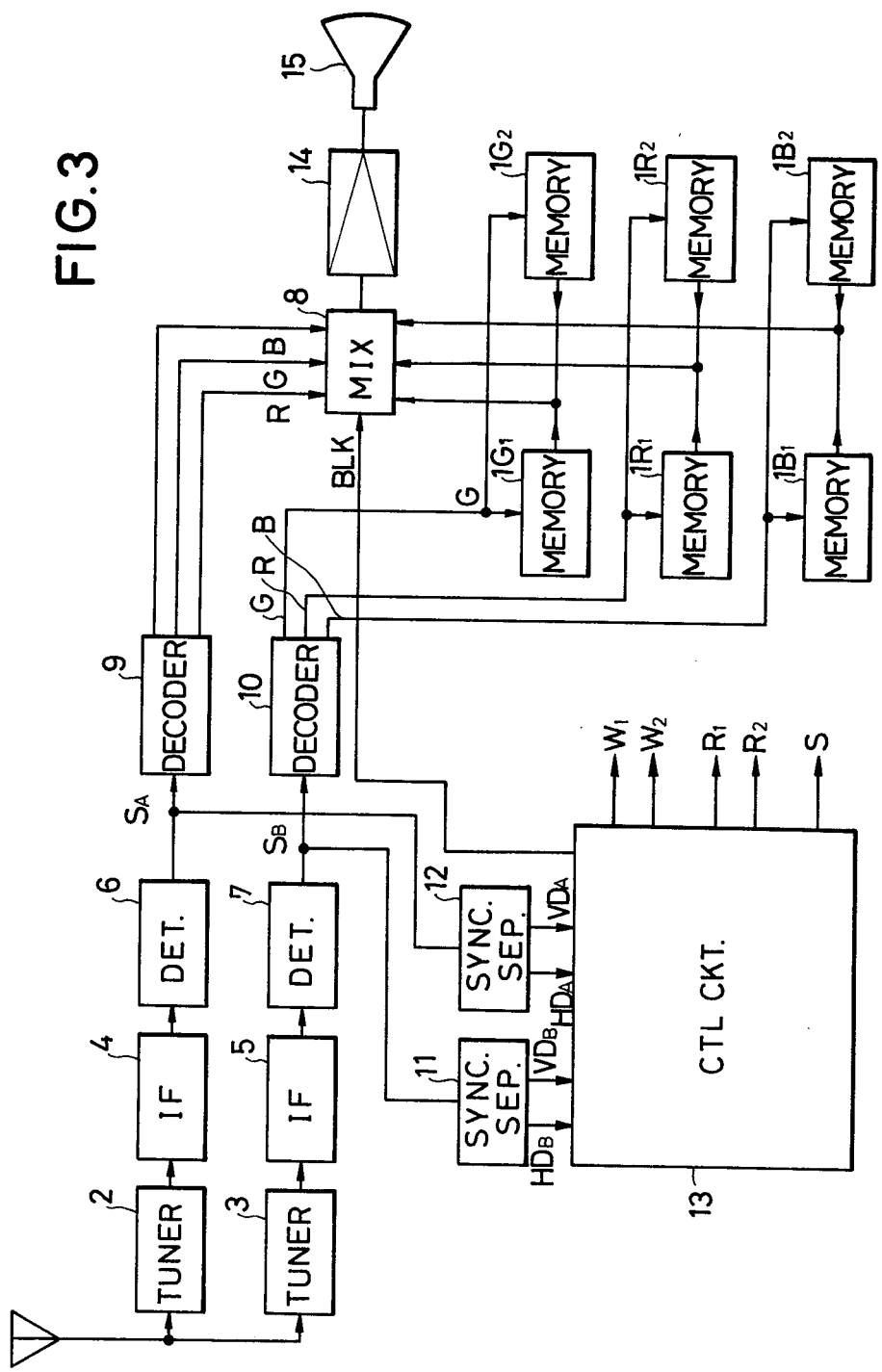
FIG. 3 is a circuit diagram according to one embodiment of this invention.

FIG. 3 shows an embodiment of a color picture-in-picture television receiver on the basis of the above described principle.

In FIG. 3, the video signals $S_A$ obtained through a tuner 2, an IF (Intermediate Frequency) amplifier 4 and a video detector 6 from an antenna are supplied to a color decoder 9. Such decoders are well known in the art as circuits which create the desired video signal such as NTSC. A color decoder, for example, contains color matrix circuits and a decoder for black and white may include sync addition circuits. R-, G- and B-signals are obtained from the decoder 9 in the well-known manner. On the other hand, the video signals $S_B$ obtained through another tuner 3, another IF amplifier 5 and another video detector 7 from the antenna are supplied to another decoder 10 similar to decoder 9. R-, G- and B-signals are obtained from the decoder 10 and are applied to one group of memories $1_{R1}$, $1_{G1}$ and $1_{B1}$ for the first field, and to another group of memories $1_{R2}$, $1_{G2}$ and $1_{B2}$ for the second field, respectively.

Further, the video signals $S_A$ and $S_B$ are supplied to synchronizing separating circuits 11 and 12, respectively. Horizontal synchronizing signals $HD_A$ and $HD_B$, and vertical synchronizing signals $VD_A$ and $VD_B$ are obtained from the synchronizing separating circuits 11 and 12, and are supplied to a control circuit 13. The two trains of writing pulses $W_1$ and $W_2$ opposite to each other in phase, two trains of read-out pulses $R_1$ and $R_2$ opposite to each other in phase, and shift pulses S are generated from the control circuit 13 on the basis of the horizontal and vertical synchronizing signals $HD_A$, $HD_B$, $VD_A$ and $VD_B$.

In fact, the pulses $W_1$, $W_2$, $R_1$, $R_2$ and S shown in FIG. 3 consist of two trains of pulses opposite to each other in phase, respectively. For the writing and reading operations based on the principle of FIG. 2, the pulses $W_1$ and $R_1$ are supplied to the memories $1_{G1}$, $1_{R2}$ and $1_{B2}$, while the pulses $W_2$ and $R_2$ are supplied to the memories $1_{G2}$, $1_{R1}$ and $1_{B1}$. The shift pulses S are supplied in common to all of the memories $1_{G1}$, $1_{R1}$, $1_{B1}$, $1_{G2}$, $1_{R2}$ and $1_{B2}$. While the information for the second field is written into the memories $1_{G2}$, $1_{R2}$ and $1_{B2}$, the information for the first field is read out from the memories $1_{G1}$, $1_{R1}$ and $1_{B1}$. After all of the information has been read out from the memories $1_{G1}$, $1_{R1}$ and $1_{B1}$, the information is read out from the memories $1_{G2}$, $1_{R2}$ and $1_{B2}$ for the second field. The writing operations are synchronized with the synchronizing signals of the video signals $S_B$. The read-out operations are synchronized with the synchronizing signals of the video signals $S_A$. The read-out information signals are supplied to a mixing circuit 8 and inserted into the predetermined portion of the video signals $S_A$.

The mixing circuit 8 contains three adder circuits, one for each color R, G, or B. Each circuit adds the partially blanked R, G or B signal of the large picture with the compressed R, G, or B of the small picture. Although only one line is shown for the output signals in the drawings for brevity, three video output signals are fed to the video amp 14. The adding circuits may be constructed as shown in prior art FIGS. 1 and 4 of pending U.S. Patent application of Toshio Suzuki, Ser. No. 095,168 filed Nov. 19, 1979.

A blanking signal BLK is formed in the control circuit 13 on the basis of the synchronizing signals $HD_A$ and $VD_A$, and is applied to the mixing circuit 8. The above predetermined portion (blanking portion) of the video signals $S_A$ is formed on the basis of the blanking signal BLK in the mixing circuit 8. The mixing video signal from the mixing circuit 8 is supplied through a video amplifier 14 to a cathode ray tube 15. Thus, the reduced picture of the video signal $S_B$ on the scale of one to three is formed in the picture of video signal $S_A$ on the screen of the cathode ray tube 15.

When the memories are constructed in the SPS manner, the pulses $W_2$ and $R_2$ can be obtained by shifting the pulses $W_1$ and $R_1$ one bit.

The control circuit 13 may be designed such as shown in FIGS. 5 and 6 of U.S. Pat. No. 4,139,860, issued Feb. 13, 1979, and incorporated herein by reference. A similar control circuit is also shown in the publication "Fully Digitalized Color Picture In Picture Television System," IEEE Transactions on Consumer Electronics, Vol. CE 25; February, 1979 by Masuda et al, incorporated herein by reference.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A system for inserting a reduced picture of a first channel broadcast into a picture of a second channel broadcast on a single screen in a picture-in-picture television receiver, comprising: a first tuner, I.F., video detector, and decoder chain for producing video signals of said first channel broadcast; a second tuner, I.F., video detector, and decoder chain for producing video signals of said second channel broadcast; a first group of three memories connected to the first chain for memorizing R, G and B signals obtained from a first field of video signals of said first channel broadcast; a second group of three memories connected to the first chain for memorizing R, G and B signals obtained from a second field of the video signals of said first channel broadcast; control means for writing in one of said R, G and B signals into a corresponding one of said first group of three memories and the remaining two of said R, G and B signals into a corresponding remaining two of said first group of three memories during said first field by first and second trains of writing pulses, respectively, the second train of pulses being opposite in phase to the first train; during said second field said control means writing in said one of the R, G and B signals into one of the second group of three memories and said remaining two of the R, G and B signals being written into a corresponding remaining two of said second group of three memories during the second field by said second train and said first train, respectively.

2. A system according to claim 1, in which said memories comprise current-transfer elements.

3. A system according to claim 2, in which said current-transfer elements comprise a Charge-Coupled Device.

4. A system according to claim 2, in which said current-transfer elements comprise a Bucket-Brigade Device.

5. A system according to claim 2, in which said current-transfer elements are arranged in Serial-Parallel-Serial construction with a plurality of said current-transfer elements arranged in parallel to one another.

6. A system according to claim 1, in which said means for writing in forms said writing pulses from synchronizing signals of said first and second channel broadcast video signals.

7. A system for inserting a reduced picture of a first channel broadcast into a picture of a second channel broadcast on a single screen in a picture-in-picture television receiver, comprising:
- a first tuner, I.F, video detector, and decoder chain for producing video signals of said first channel broadcast;
- a second tuner, I.F, video detector, and decoder chain for producing video signals of said second channel broadcast;
- a first group of three memories connected to the first chain for memorizing R, G and B signals obtained from a first field of video signals of said first channel broadcast;
- a second group of three memories connected to the first chain for memorizing R, G and B signals obtained from a second field of the video signals of said first channel broadcast;
- control means providing a first train of writing pulses for writing in during a first field one of said R, G and B signals into a corresponding one of said first group of three memories and a second train of writing pulses opposite to the first train writing in the remaining two of said R, G and B signals into a corresponding remaining two of said first group of three memories during said first field;
- said control means during the second field writing in said one of said R, G and B signals with the second pulse train into a corresponding one of said second group of three memories, and writing in with the first pulse train said remaining two of the R, G and B signals into the corresponding remaining two of said second group of three memories during the second field.

8. The system of claim 7 wherein the control means is synchronized by horizontal and vertical synchronization signals from the first and second channel broadcast.

* * * * *